United States Patent [19]

Rialan et al.

[11] Patent Number: 5,706,250
[45] Date of Patent: Jan. 6, 1998

[54] SEISMIC TRANSMISSION METHOD AND SYSTEM UTILIZING CONCENTRATION UNITS

[75] Inventors: Joseph Rialan, Meudon; Christian Grouffal, Rueil-Malmaison, both of France

[73] Assignee: Institut Francais du Petrole, Rueil-Malmaison, France

[21] Appl. No.: 741,102

[22] Filed: Oct. 30, 1996

Related U.S. Application Data

[63] Continuation of Ser. No. 134,827, Oct. 12, 1993, abandoned.

[30] Foreign Application Priority Data

Oct. 12, 1992 [FR] France ................... 92 12328

[51] Int. Cl.$^6$ .................. G01V 1/22; H03G 3/20
[52] U.S. Cl. ............ 367/77; 367/80; 340/825.15
[58] Field of Search .............. 367/77, 80; 340/825.15

[56] References Cited

U.S. PATENT DOCUMENTS

| | | | |
|---|---|---|---|
| 4,583,206 | 4/1986 | Rialan et al. | 367/77 |
| 4,712,199 | 12/1987 | Rialan et al. | 367/77 |
| 4,725,992 | 2/1988 | McNatt et al. | 367/77 |
| 4,815,044 | 3/1989 | Deconinck et al. | 367/77 |
| 4,905,205 | 2/1990 | Rialan | 367/77 |
| 4,908,803 | 3/1990 | Rialan | 367/77 |
| 4,979,152 | 12/1990 | Rialan et al. | 367/77 |
| 5,206,835 | 4/1993 | Beauducel | 367/77 |
| 5,276,655 | 1/1994 | Rialan et al. | 367/77 |

FOREIGN PATENT DOCUMENTS

| | | |
|---|---|---|
| 0115717 | 8/1984 | European Pat. Off. |
| 0250280 | 12/1987 | European Pat. Off. |
| 0260165 | 3/1988 | European Pat. Off. |
| 0329546 | 8/1989 | European Pat. Off. |
| 0501857 | 9/1992 | European Pat. Off. |
| 2105079 | 3/1983 | United Kingdom. |

*Primary Examiner*—Nelson Moskowitz
*Attorney, Agent, or Firm*—Antonelli, Terry, Stout & Kraus, LLP

[57] ABSTRACT

Seismic data acquisition devices (BA) distributed in an exploration zone are divided into n groups (GA1 to GAn) and, therein, into sub-groups having each a specific frequency for communicating with a concentration unit (Ck) which is connected to a central station (1) through Hertzian channels or cables or optical fibers. Acquisition devices in the various subgroups communicate simultaneously with the corresponding concentration unit (Ck) during predetermined emission windows. The concentration unit collects the signals received from the acquisition devices to transmit them in series to station (1). The acquisition devices are adapted for delaying their own emission window according to the rank which has been previously assigned thereto within the respective subgroups thereof.

19 Claims, 4 Drawing Sheets

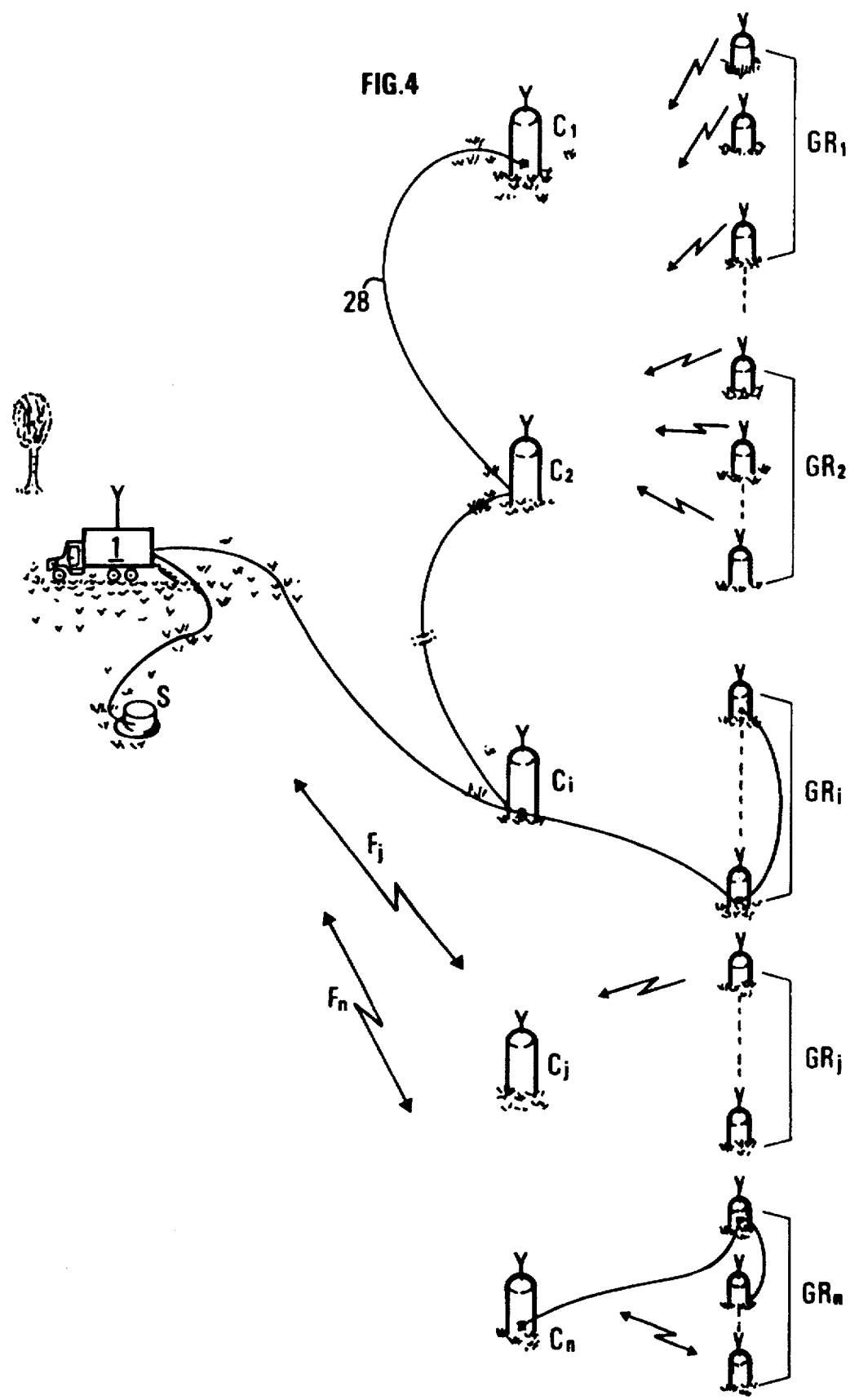

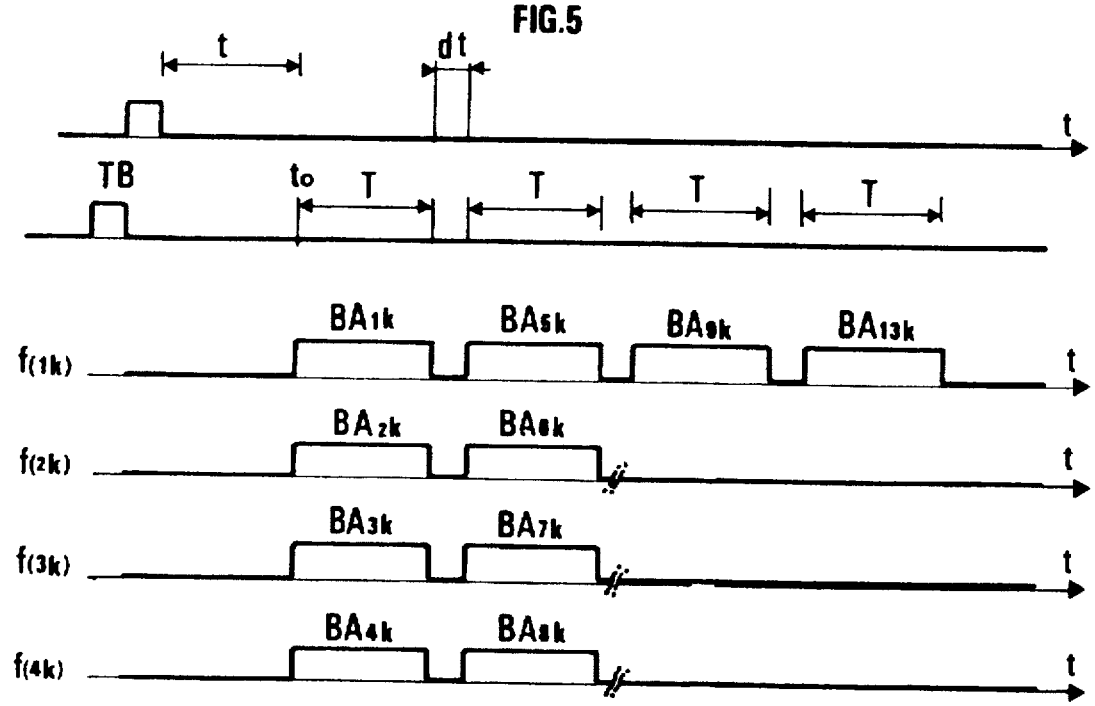

SEISMIC TRANSMISSION METHOD AND SYSTEM UTILIZING CONCENTRATION UNITS

This application is a continuation of Ser. No. 08/134,827, filed Oct. 12, 1993, and now abandoned.

BACKGROUND OF THE INVENTION

1. Field of the Invention

The invention relates to a method and a system for transmitting signals between groups of data acquisition devices and a central station by means of concentration units.

More particularly the method and the system of the invention relates to seismic prospecting, where a large quantity of signals have to be transferred to a central station such as a recording truck and are picked up by a large number of receivers such as geophones, arranged in contact with the ground above a geological formation to be studied, in response to seismic signals transmitted by a seismic source and reflected by the subsoil discontinuities.

2. Description of the Prior Art

Current seismic prospecting methods include using acquisition devices distributed over several kilometers for collecting the signals received by at least one receiver, for digitizing and storing the signals in a local memory before they are transmitted in real or delayed time to a central station through a transmission channel such as a cable, an optical fiber, a radio channel, etc.

Various seismic data transmission systems are used to connect acquisition devices to a central station. Links may be provided by cables, radio channels, via one or several possible relays; cable and radio links may also be combined as shown for example in patents FR-2,599,533 corresponding to U.S. Pat. No. 4,815,044; 2,538,561 corresponding to U.S. Pat. No. 4,979,512; 2,511,772 corresponding to U.S. Pat. No. 4,583,206 or 2,627,652 corresponding to U.S. Pat. No. 4,908,803.

French Patent 2,511,772 describes a transmission system in which a central station communicates directly with a first array of acquisition devices by means of a first radio channel and, by means of a second radio channel, with a radiorelay which communicates with a second array of acquisition devices by means of a third radio channel. This mixed layout allows easy adaptation to topography changes or to radio link difficulties in zones where seismic exploration surveys are carried out.

French Patent 2,627,652 describes a semisequential transmission system allowing simultaneous communication of groups of seismic acquisition devices with a central station by means of several radio transmission channels of different frequencies. In each group, the devices are respectively allocated different serial numbers according to their location in the field. Each one of them determines the difference between its own serial number and a serial number received by radio and which is the number assigned to the first device of the group to which it belongs and it transmits the data which have been recorded thereby.

It is thus possible, with a single order, to control the semisequential transmission, towards the central station, of data coming from determined groups of acquisition devices.

The digitized data acquired by the acquisition boxes in the field are generally transmitted for example by series of 32 or 64 digital words included in a transmission frame and the transmitter waits for an acknowledgement signal from the central station before the emission of a new series of words. This transmission mode is relatively slow.

SUMMARY OF THE INVENTION

The transmission method according to the invention allows transmission to a central control and recording station, by means of a predetermined number n of concentration units, of digitized data stored in a plurality of seismic data acquisition devices distributed in an acquisition zone, these data corresponding to signals received by sensors and coming from discontinuities of a geological formation in response to seismic signals transmitted in the subsoil by a seismic source. The method comprises:

- dividing at least part of the acquisition devices into a number of groups at least equal to the number n of concentration units, each unit including at most a number of acquisition devices;
- assigning to each group (Gi) a determined number of specific radio transmission frequencies, the number being less than the number of devices defined for each group, the acquisition devices of a single group and the associated concentration unit (Ci) being provided each with a radio transmission device on at least one of the specific frequencies;
- subdividing each group into subgroups of acquisition devices utilizing the same transmission frequency, for all the groups of acquisition devices, and assigning different serial numbers to the acquisition devices of a single subgroup;
- sending from the central station a single transmission order to all the concentration units and to all the acquisition device, and
- transmitting signals successively by means of all the acquisition devices of a single subgroup during staggered emission windows, each acquisition device delaying the emission window thereof by a time interval depending on its serial number in the subgroup to which it belongs, the transmissions of all the subgroups of any of the various groups being performed within a time interval.

If the acquisition devices are each provided each with a transmission device for transmitting on several different frequencies, the method may comprise sending an order to all the devices of a single group allowing switching of the transmission frequency to a determined frequency so as to assign them to a determined subgroup.

The method may further comprise sending an order allowing different serial numbers to be assigned to all the acquisition devices of each of the subgroups.

According to an embodiment, at least part of the concentration units is provided with radio communication devices for communicating with the central station at a frequency distinct for each one of the units, the signals received at the same time from the acquisition devices of the various subgroups which are be transmitted to the central station are transmitted successively by using this distinct frequency.

According to another embodiment, at least part of the concentration units may be connected to the central station by means of at least one material transmission channel.

The transmission system implementing the method according to the invention comprises a determined number n of concentration units each provided with a device for communicating with the central control and recording station and with a radio transmitter-receiver set for communicating simultaneously on several different frequencies each with a group of acquisition devices.

Each acquisition device of a single group includes a storage for storing a serial number, transmitter-receiver means for operation on at least one determined transmission frequency, a decoder for decoding orders transmitted by the control and recording station, a clock for generating a time scale which is substantially the same for all the acquisition devices of the array, and a processing set allowing demarcation of an emission window and staggering thereof by an interval depending on the serial number assigned to the device, to read the data acquired in the storage and to transmit them at the determined frequency.

With the invention, a single order allows control of the transmission to the control and recording station of all of the data stored in the array of acquisition devices distributed in the field by means of a limited number of transmission frequencies. The control and recording station receives simultaneously streams of signals (coming from the concentration units), each stream resulting from the sequencing of signals received simultaneously from acquisition devices of different subgroups of a single group, the devices of a single subgroup recognizing autonomously and automatically a certain priority order.

BRIEF DESCRIPTION OF THE DRAWINGS

Other features and advantages of the transmission method and system according to the invention will be clear from reading the description hereafter of embodiments given by way of non limitative examples, with reference to the accompanying drawings in which:

FIG. 4 shows another embodiment utilizing mixed transmission modes utilizing radio and non wireless transmission, and FIG. 5 shows an example of the positioning of emission windows of several acquisition devices within a single group.

DESCRIPTION OF THE PREFERRED EMBODIMENTS

Figure 1:
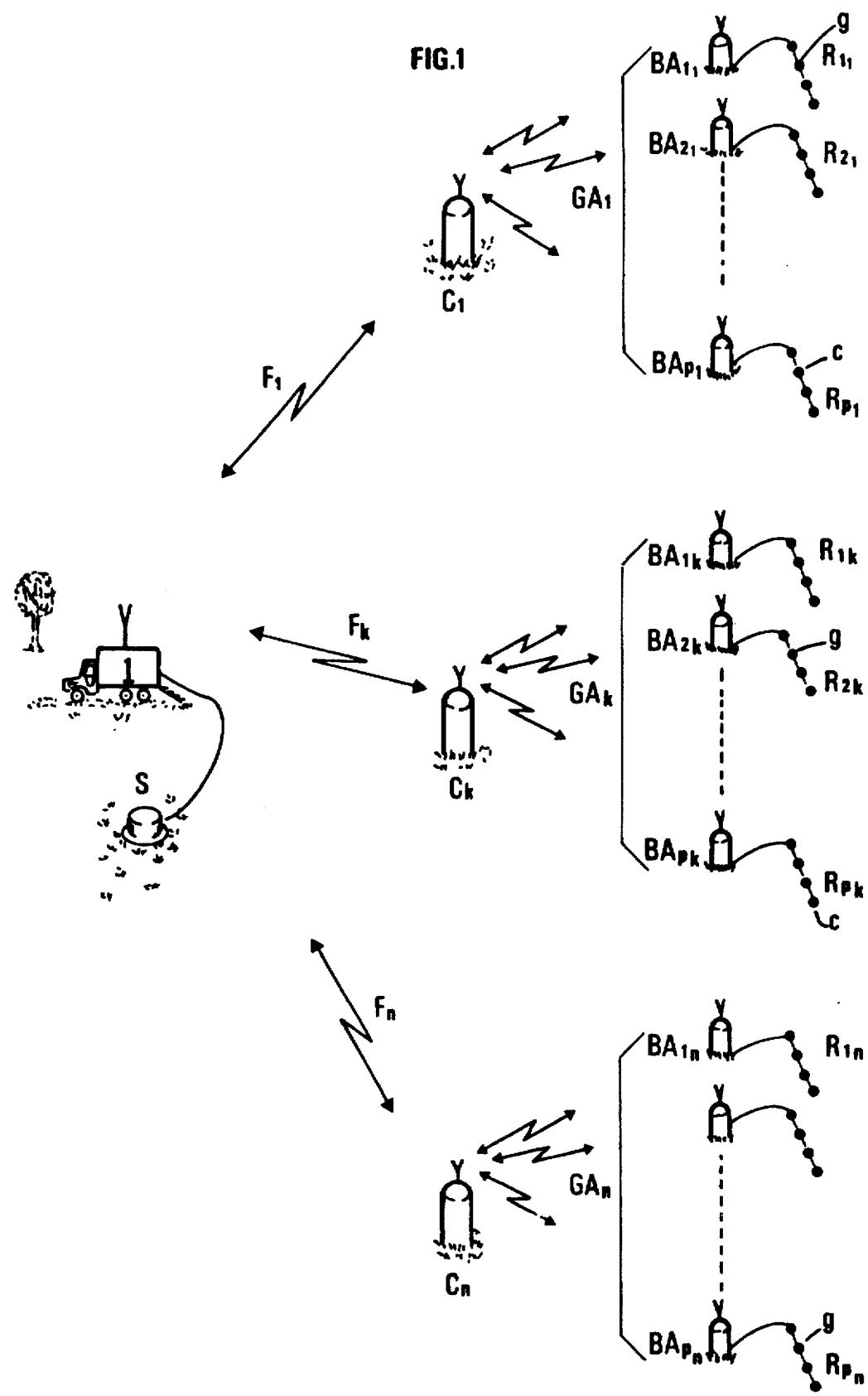
FIG. 1 shows a first embodiment of the invention where all the exchanges between the acquisition devices, the concentration units and the central station are carried out by radio.

The seismic device shown in FIG. 1 includes seismic receivers R11 to Rpn spaced apart from one another and distributed over a zone to be explored so as to pick up the seismic waves reflected by subsoil discontinuities, in response to the transmission, in the ground, of seismic waves produced by a source S, and a central control and recording station 1. Each of these receivers R is most often made up of the electric interconnection of several lined-up elementary sensors g. All the receivers R11 to Rpn are connected to data acquisition devices BA11 to BApn for digitizing and for storing temporarily the seismic data collected by the associated receiver R.

The array of receivers R11 to Rpn is subdivided into n groups GA1, GA2 . . . GAn each including a number of p associated receivers and acquisition devices. Any group of order k for example comprises p receivers R1k, R2k . . . Rpk connected respectively to p acquisition devices BA1k, BA2k, BApk. A concentration unit C1 . . . Ck . . . Cn is associated with each group of receivers and acquisition devices. These units are arranged to relay respectively communications between the central station 1 and the devices of the associated group of devices GA1 . . . GAk . . . GAn. Each group Gi is assigned a number of q transmission frequencies fi1, fi2 . . . fiq, generally less than the number of p acquisition devices of the groups. Preferably, these frequencies are specific to each group. The devices of each group Gi are divided into q subgroups each including each several acquisition devices and each of the subgroups is assigned a frequency among the q specific frequencies fi1 to fiq available.

The transmission method which is implemented assigns a subgroup to each acquisition device and in assigning thereto a certain rank which sets the utilization rules for the transmission frequency f assigned to its subgroup.

For example, if any group GAk has 4 frequencies f1k, f2k, f3k, f4k, the devices of the group are numbered from 1 to p. The first frequency f1k is assigned to the devices numbered BA1 BA5k, BA9k, BA13k, etc, frequency f2k is assigned to the devices numbered BA2k, BA6k, etc; frequency f3k is assigned to the devices numbered BA3k, BA7k, etc, and frequency f4k is assigned to the devices numbered BA4k, BA8k, etc, with successive 4-device shifts in each subgroup. Furthermore, each device is also assigned an emission time of a determined duration. This time is calculated from the number of samples to be transmitted and from the data rate selected for the transmission. It ranges for example between about 0.12 s and 4 s.

Under these conditions, when, after seismic transmission-reception cycles, the devices of group Gk are given from the control and recording station, an emission order TB to transmit the seismic data which has been stored and when they are effectively ready to transmit from an initial instant t0 (FIG. 5), the first acquisition devices to transmit during the set interval T are devices BA1k, BA2k, BA3k and BA4k at the head of the respective subgroups thereof. By comparing their serial number with those of the leading devices, the following four devices BA5k to BA8k calculate that they have to shift their respective emission windows by an interval T increased by a safety interval dt sufficient to take into account possible disparities in the time base signals of the various devices. The following four devices, by means of an analogous comparison operation, shift their respective windows by an interval equal to 2(T+dt), etc.

The concentration units are arranged at relatively small distances for which the power required for the radio transmitters is low, about 100 mW for example or even less. Since the telecommunication regulations are not restricting for such low power, a great number of parallel communication channels is easily available between the various subgroups and the associated concentration unit. The number of higher powered radio channels which require a license may therefore be highly restricted.

Communications between the acquisition devices in the field and the central station may be speeded up if the data are transmitted without any interposed acknowledgement message. In this case, a well-known transmission method with interlacing and error checking is preferably selected so as to minimize the influence of possible disturbances such as that described in French patent 2,673,298.

Figure 2:
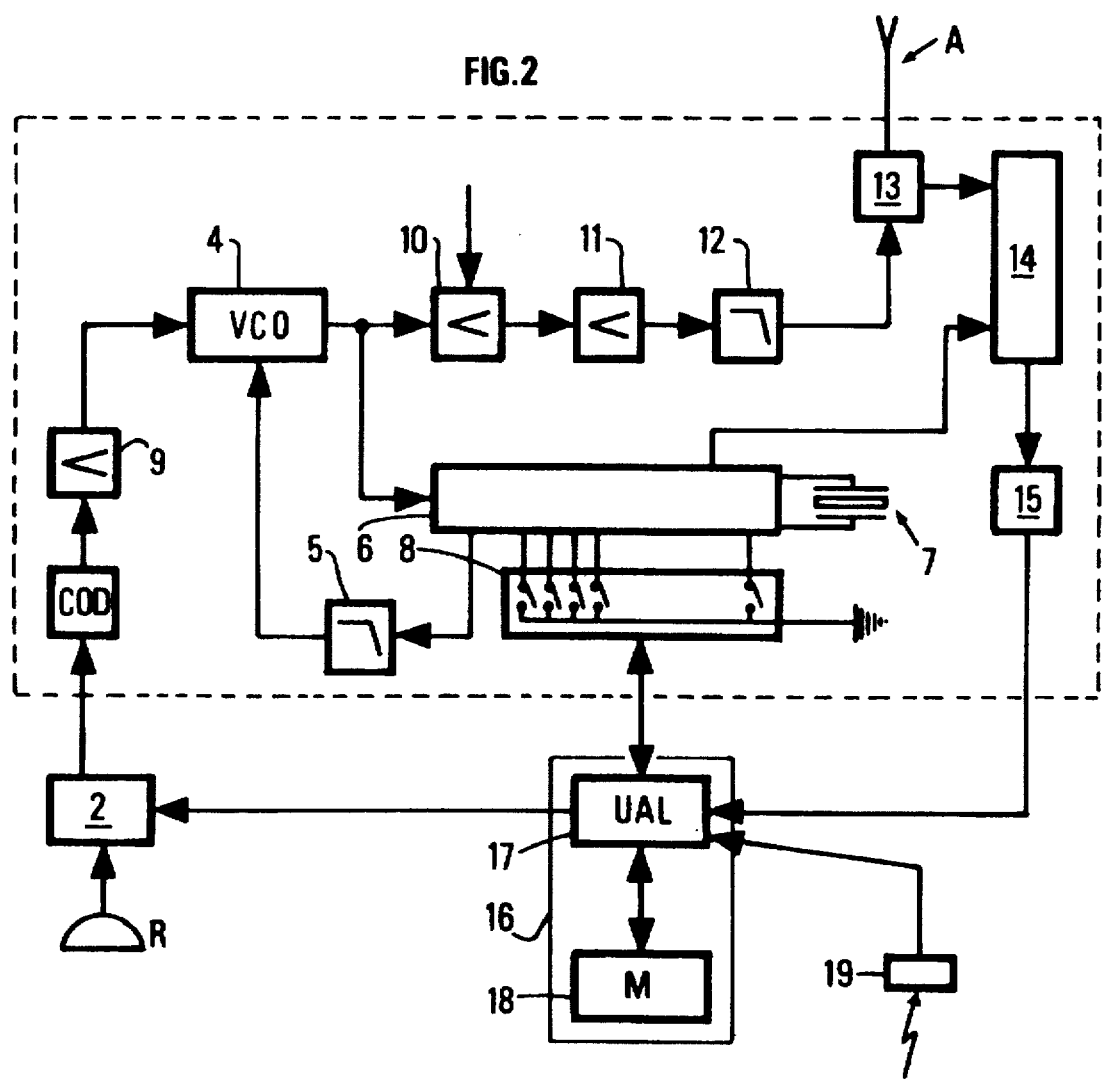
FIG. 2 shows an example of the embodiment of an acquisition device in accordance with the invention.

Each of the acquisition devices includes for example as illustrated in FIG. 2 an acquisition unit 2 for amplifying the signals of the associated seismic receiver R, digitizing and storing them. In case several receivers are connected to the same device, the device further comprises a multiplexer at the top (not shown), as it is well-known in the art. Acquisition unit 2 is connected to a transmitter-receiver set 3 arranged for transmitting and receiving signals at a selected frequency depending on the group and on the subgroup to which the device concerned belongs.

The transmission-reception set 3 includes an oscillator 4 of the VCO type whose oscillation frequency is determined by application of a control voltage coming from a low-pass filter 5. The input of filter 5 is connected to the output of a frequency synthesizer circuit 6 of a well-known type including phase feedback loops (PLL) and a predivider allowing a programmable reduction factor to be applied to the reference frequency defined by a quartz crystal 7. Selection of this reduction factor is achieved by controlling selectively switches of an array of switches 8. The signal applied at the input of synthesizer circuit 6 is the signal of the VCO type oscillator 4.

Switching allows a specific frequency, among the nine frequencies available for each group G, to be assigned and may be performed by an operator at the time of the setting up of the acquisition devices in the field.

The signal delivered by acquisition unit 2 is applied to a coding element COD of the NRZ type for example, then amplified in an amplification stage 9 and applied at the "modulation" input of oscillator 4. The modulated carrier available at the output of oscillator 4 is applied to an amplification system including a pre-amplifier 10, a power amplifier 11 and a low-pass filter 12. The amplified signal is applied to a transmitter-receiver antenna 13 by means of an antenna duplexer of a well-known type. A radio receiver 14 receives the coded control signals coming directly from the central laboratory, encoded by a signal transmitted at a predetermined frequency common to all the acquisition devices, is also connected to antenna duplexer 13. Demodulation of the received signals is achieved by using a signal produced by the frequency synthesizer circuit 6. The demodulated signals coming from receiver 14 are decoded by decoder 15 and then applied to a micro-processing unit 16 including an arithmetic-logic unit 17 and a memory unit 18. Unit 17 includes an input port for the connection of an interface element 19 suited to the link type. It is for example possible to use an infrared optical receiver such as that described French Patent 2,602,875, which allows an operator to transmit instructions to the acquisition device without having to establish a wireline link therewith. Interface element 19 may also consist, as the case may be, of a radio receiver or of a connection for a transmission cable. A connection 20 is achieved between arithmetic-logic unit 17 and the array of switches 8, so that the transmission frequency may be changed at will.

The acquisition devices are for example placed in sealed boxes allowing them to be used in damp zones (lakes, bogs, forests, etc). The seismic equipment may for example include several hundred acquisition devices.

The processing unit 17 of each acquisition device is programmed to make the calculations necessary for the positioning of each emission window according to the serial number, the assigned frequency and the rank allocated to the device in the subgroup thereof. The data necessary for these positioning calculations may be fed into each device at the time of its setting up in the field for example, by means of an interface unit 19, or transmitted from central station 1 before the beginning of the planned seismic recording operations. This transmission of calculation data may in this case be performed by direct transmission or via concentration units C1 to Cn.

Processing unit 17 may be programmed to carry out all the operations necessary for allocating a transmission frequency and for the relative positioning of the emission windows from the serial number of the acquisition device in the field alone, which is introduced at the time of the setting thereof.

Figure 3:
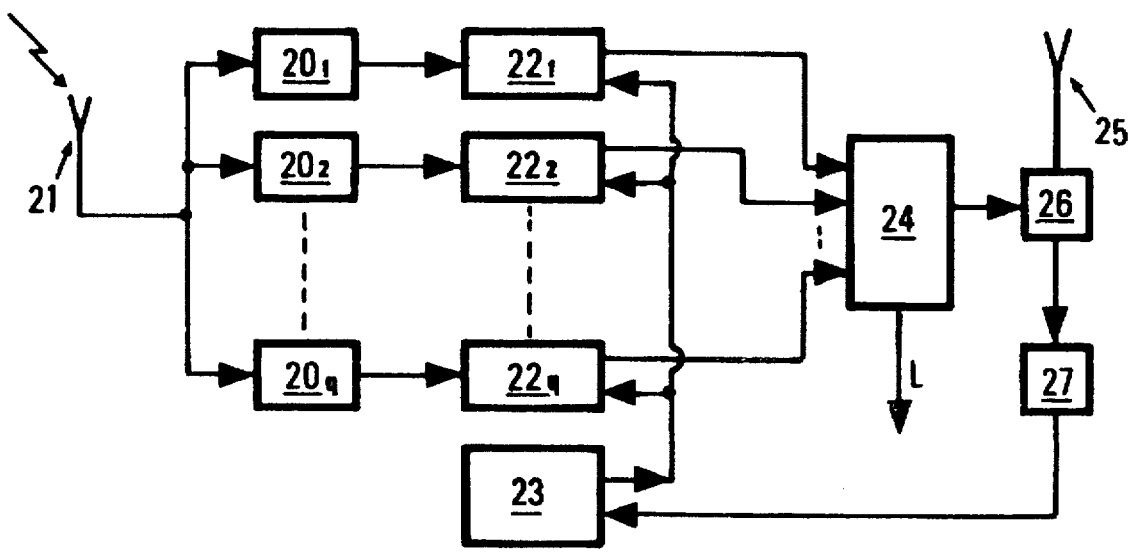
FIG. 3 shows an example of the embodiment of a concentration unit in accordance with the invention.

Each one of these concentration units Ci includes as illustrated in FIG. 3 radio receiver comprising q modules 201, 202 . . . 20q connected in parallel to an antenna 21 adjusted to the q frequencies fi1 to fiq assigned to the associated group Gi, to separate signals received simultaneously from q acquisition devices among the n of this group. After their separation, the signals received are placed into storage blocks 221, 222 . . . 22q of the FIFO type for example. These blocks are controlled by a synchronization module 23 for managing the simultaneous storing of the signals received and the sequential rereading thereof. The reading mode selected allows a set of q different signals received simultaneously from q acquisition devices of group Gi and stored to be converted into a stream of q successive signals which may be retransmitted on a single transmission channel such as a radio channel.

According to the embodiment of FIG. 4, n radio channels of respective frequencies F1 . . . Fk . . . Fn are used to achieve the sequential transmissions from the n concentration units C1 . . . Ck . . . Cn and central station 1. In this case, storage blocks 22 to 22q are connected to a radio transmitter 24 adjusted to the frequency Fk allocated to concentration unit Ck and connected to antenna 25 by means of a duplexer 26. The duplexer 26 also allows antenna 25 to be connected to a radio receiver 27 adjusted for example to frequency Fk so as to detect controls coming from central station 1.

According to the embodiment of FIG. 3, concentration units Ci are used which may either transmit or receive signals by a radio channel and by a non wireless material channel L such as a transmission cable or an optical fiber, in accordance with an implementation analogous to that described in the above-cited French Patent 2,511,772. When the application planned allows or requires it, at least a part C1, C2 . . . Ci of the concentration units is preferably connected to the central station by means of a common cable or fiber 28.

Without departing from the scope of the invention, at least part of the acquisition devices of a group such as group Gn in FIG. 3 may be connected to the associated concentration unit (Cn) by means of a material link.

Similarly, without departing from the scope of the invention, acquisition devices BA capable of acquiring by multiplexing the signals coming from several receivers R may be used.

We claim:

1. A method of transmitting digitized data stored in a plurality of seismic data acquisition devices distributed in an acquisition zone produced from seismic signals transmitted through a subsoil of a geological formation containing discontinuities from a number of concentration units to a control and recording station comprising:

dividing at least part of the acquisition devices into groups with a number of the groups being at least equal in number to the number of concentration units with each group including a number of acquisition devices;

assigning to each group a number of radio transmission frequencies with the assigned number of radio transmission frequencies being less than the number of acquisition devices and defined for each group, the acquisition devices of each group being associated with a different one of the concentration units and having a transmitting device operating on at least one of the assigned number of transmission frequencies;

subdividing each group into at most the assigned number of subgroups of acquisition devices utilizing identical transmission frequencies and assigning different serial numbers to the acquisition devices of each subgroup;

sending a transmission order from the control and recording station to all of the concentration units and the acquisition devices to request transmission of signals; and transmitting signals successively from all of the acquisition devices of one of the subgroups with each signal being within an emission window staggered from other emission windows used to transmit other of the successive signals with each emission window being dependent upon the assigned serial number in the subgroup with the transmission of all of the subgroups being made during a subgroup transmission time interval.

2. A method in accordance with claim 1 wherein:

the transmitting device transmits on a plurality of different frequencies with an order being sent from the control and recording station to all of the acquisition devices of each group specifying a transmission frequency assigned to one of the subgroups.

3. A method in accordance with claim 1 further comprising:

sending an order from the control and recording station to all of the acquisition devices of each group assigning different serial numbers to all of the acquisition devices of each of the subgroups.

4. A method in accordance with claim 1 wherein:

at least part of the concentration units are provided with a radio communication device to communicate with the control and recording station using a radio frequency which is distinct for each of the concentration units with signals being transmitted to the acquisition devices of the subgroups being transmitted successively on the distinct radio frequency.

5. A method in accordance with claim 1 wherein:

at least a part of the concentration units are connected to the control and recording station by non-wireless transmission channel.

6. A transmission system for transmitting digitized data stored in a plurality of seismic data acquisition devices distributed in an acquisition zone produced from seismic signals transmitted through a subsoil of a geological formation containing discontinuities from concentration units to a control and recording station comprising:

a number of concentration units with each concentration unit having a transmitting device for communication with the control and recording station and a radio transmitting and receiving set for communicating simultaneously on several frequencies with a group of the acquisition devices; and each acquisition device of the group having a storage of a serial number determining a priority rank of the acquisition device in a subgroup of the acquisition devices, a transmitting and receiving device which transmits on at least one radio transmission frequency, a decoder for decoding orders transmitted to the acquisition device from the control and recording station, a timing device for generating a time reference common to all of the acquisition devices of the group, and a processing device for determining an emission window for transmitting signals successively from all of the acquisition devices in the subgroup with the emission window of each of the acquisition devices being staggered from the emission window of the other acquisition devices in dependence upon the stored serial number.

7. A transmission system in accordance with claim 6 wherein:

at least part of the acquisition devices have a transmitting device for transmitting data on a non-wireless channel.

8. A transmission system in accordance with claim 6 wherein:

at least part of the concentration units have a transmitting device for transmitting data on a non wireless channel.

9. A transmission system in accordance with claim 6 wherein:

at least part of the acquisition devices include a transmitter and receiver which operates on a plurality of selectible transmission frequencies assigned to the subgroup and a switch controlled by a processing unit for selecting one of the selectible transmission frequencies.

10. A system in accordance with claim 9 wherein:

the processing unit includes and arithmetic unit, a storage unit and an interface element permitting assigning of a serial number to an associated acquisition device.

11. A system in accordance with claim 9 wherein:

the transmitter and receiver of each of the at least part of the acquisition devices includes an oscillator controlled by a circuit having a frequency synthesizer applying a reduction factor dependent upon an output of the switch to the frequency synthesizer for controlling a reference frequency thereof, and a receiver, coupled the processing unit, for receiving transmissions for controlling the switch.

12. A system in accordance with claim 11 wherein:

the oscillator includes a modulation input for receiving signals of an array of the a acquisition devices; and a coding element, coupled to the modulation input, for coding the signals received from the array of the acquisition devices, and an amplifier, having an output coupled to an output of the coding element and an output coupled to the modulation input, for amplifying coded signals produced by the coding element.

13. A system in accordance with claim 6 wherein:

each concentration unit includes a receiver for separating signals received simultaneously on a plurality of radio channels into a plurality of different outputs with each output containing a signal transmitted on a different one of the radio channels, a plurality of storages with a different storage being coupled to a different output for storing the outputted signal, a control, coupled to the plurality of storages, for controlling sequential readout of the stored outputted signal, and a transmitting device for transmitting the sequentially readout signals to the control and recording station.

14. A system in accordance with claim 7 wherein:

each concentration unit includes a receiver for separating signals received simultaneously on a plurality of radio channels into a plurality of different outputs with each output containing a signal transmitted on a different one of the radio channels, a plurality of storages with a different storage being coupled to a different output for storing the outputted signal, a control, coupled to the plurality of storages, for controlling sequential readout of the stored outputted signal, and a transmitting device for transmitting the sequentially readout signals to the control and recording station.

15. A system in accordance with claim 8 wherein:

each concentration unit includes a receiver for separating signals received simultaneously on a plurality of radio channels into a plurality of different outputs with each output containing a signal transmitted on a different one of the radio channels, a plurality of storages with a different storage being coupled to a different output for storing the outputted signal, a control, coupled to the plurality of storages, for controlling sequential readout of the stored outputted signal, and a transmitting device for transmitting the sequentially readout signals to the control and recording station.

16. A system in accordance with claim 9 wherein:

each concentration unit includes a receiver for separating signals received simultaneously on a plurality of radio channels into a plurality of different outputs with each output containing a signal transmitted on a different one of the radio channels, a plurality of storages with a different storage being coupled to a different output for storing the outputted signal, a control, coupled to the plurality of storages, for controlling sequential readout of the stored outputted signal, and a transmitting device for transmitting the sequentially readout signals to the control and recording station.

17. A system in accordance with claim 10 wherein:

each concentration unit includes a receiver for separating signals received simultaneously on a plurality of radio channels into a plurality of different outputs with each output containing a signal transmitted on a different one of the radio channels, a plurality of storages with a different storage being coupled to a different output for storing the outputted signal, a control, coupled to the plurality of storages, for controlling sequential readout of the stored outputted signal, and a transmitting device for transmitting the sequentially readout signals to the control and recording station.

18. A system in accordance with claim 11 wherein:

each concentration unit includes a receiver for separating signals received simultaneously on a plurality of radio channels into a plurality of different outputs with each output containing a signal transmitted on a different one of the radio channels, a plurality of storages with a different storage being coupled to a different output for storing the outputted signal, a control, coupled to the plurality of storages, for controlling sequential readout of the stored outputted signal, and a transmitting device for transmitting the sequentially readout signals to the control and recording station.

19. A system in accordance with claim 12 wherein:

each concentration unit includes a receiver for separating signals received simultaneously on a plurality of radio channels into a plurality of different outputs with each output containing a signal transmitted on a different one of the radio channels, a plurality of storages with a different storage being coupled to a different output for storing the outputted signal, a control, coupled to the plurality of storages, for controlling sequential readout of the stored outputted signal, and a transmitting device for transmitting the sequentially readout signals to the control and recording station.

\* \* \* \* \*